(12) United States Patent
Kerr

(10) Patent No.: US 6,463,981 B1
(45) Date of Patent: Oct. 15, 2002

(54) LAMINATOR ASSEMBLY HAVING A PRESSURE ROLLER WITH A DEFORMABLE LAYER

(75) Inventor: Roger S. Kerr, Brockport, NY (US)

(73) Assignee: Eastman Kodak Company, Rochester, NY (US)

( * ) Notice: Subject to any disclaimer, the term of this patent is extended or adjusted under 35 U.S.C. 154(b) by 120 days.

(21) Appl. No.: 09/676,877

(22) Filed: Sep. 29, 2000

Related U.S. Application Data

(63) Continuation-in-part of application No. 09/133,243, filed on Aug. 13, 1998, now abandoned.

(51) Int. Cl.⁷ ............................................. B32B 31/00
(52) U.S. Cl. ..................... 156/555; 156/582; 156/583.1
(58) Field of Search ................................ 156/555, 580, 156/582, 583.1; 492/28, 46, 48, 49, 53, 56

(56) References Cited

U.S. PATENT DOCUMENTS

| | | |
|---|---|---|
| 3,658,629 A | 4/1972 | Cramer et al. |
| 3,743,403 A | 7/1973 | Sanza |
| 3,781,517 A | 12/1973 | Skamra |
| 3,781,902 A | 12/1973 | Shim et al. |
| 3,810,735 A | 5/1974 | Moser |
| 3,976,370 A | 8/1976 | Goel et al. |
| 4,242,566 A | 12/1980 | Scribner |
| 4,253,008 A | 2/1981 | Dolan |
| 4,353,776 A | 10/1982 | Giulie et al. |
| 4,427,474 A | 1/1984 | Ottaviano |
| 4,435,633 A | 3/1984 | Stryjewski |
| 4,470,589 A | 9/1984 | Singer |
| 4,496,415 A | 1/1985 | Sprengling |
| 4,521,095 A | 6/1985 | Mayer |
| 4,582,416 A | 4/1986 | Karz et al. |
| 4,912,486 A | 3/1990 | Yumino |
| 4,922,304 A | 5/1990 | Gilbert et al. |
| 4,937,631 A | 6/1990 | Kim et al. |
| RE33,288 E | 8/1990 | Obayashi |
| 4,966,464 A | 10/1990 | Matoushek |
| 4,985,731 A | 1/1991 | Sakakura et al. |
| 5,053,828 A | 10/1991 | Ndebi et al. |
| 5,055,884 A | 10/1991 | Ndebi et al. |
| 5,081,502 A | 1/1992 | Mitsuya et al. |
| 5,153,656 A | 10/1992 | Johnson et al. |
| 5,262,834 A | 11/1993 | Kusaka et al. |
| 5,268,559 A | 12/1993 | Jacobs |
| 5,268,989 A | 12/1993 | Moslehi et al. |
| 5,275,715 A | 1/1994 | Tuttle |
| 5,293,537 A | 3/1994 | Carrish |
| 5,300,182 A | 4/1994 | DeCook et al. |
| 5,300,183 A | 4/1994 | DeCook |
| 5,311,269 A | 5/1994 | Aslam et al. |
| 5,321,480 A | 6/1994 | Merle et al. |
| 5,339,148 A | 8/1994 | Johnson et al. |
| 5,349,424 A | 9/1994 | Dalal et al. |
| 5,356,507 A | 10/1994 | Wojtanowitsch et al. |
| 5,356,833 A | 10/1994 | Maniar et al. |
| 5,358,901 A | 10/1994 | Fiordalice et al. |

(List continued on next page.)

OTHER PUBLICATIONS

Kerr, "A Laminator Assembly Having an Endless Belt," USSN 09/133,248, filed Aug. 13, 1998 (Attorney Dockett No. 78275DAN).

*Primary Examiner*—James Sells
(74) *Attorney, Agent, or Firm*—Nelson Adrian Blish

(57) ABSTRACT

A laminating assembly and method bonds a lamination sheet to receiver stock. The laminating assembly includes a pressure roller arrangement which comprises upper and lower pressure rollers (16, 18). At least one of the upper and lower pressure rollers includes at least one deformable layer. The roller arrangement including the at least one deformable layer permits an increase in a width of a nip portion (32) between the upper and lower rollers to overcome lateral shear stresses and overdrive.

5 Claims, 7 Drawing Sheets

U.S. PATENT DOCUMENTS

| | | |
|---|---|---|
| 5,421,255 A | 6/1995 | Kryk |
| 5,428,430 A | 6/1995 | Aslam et al. |
| 5,478,434 A | 12/1995 | Kerr et al. |
| 5,489,974 A | 2/1996 | Kamaji et al. |
| 5,512,126 A | 4/1996 | Kannabiran et al. |
| 5,531,854 A | 7/1996 | Kerr et al. |
| 5,640,662 A * | 6/1997 | Sugimoto et al. ........... 399/333 |

* cited by examiner

140

LAMINATOR ASSEMBLY HAVING A PRESSURE ROLLER WITH A DEFORMABLE LAYER

CROSS REFERENCE TO RELATED APPLICATIONS

This is a continuation-in-part of application Ser. No. 09/133,243, filed Aug. 13, 1998; abandoned entitled "Laminator Assembly Having a Pressure Roller with a Deformable Layer" by Roger S. Kerr.

FIELD OF THE INVENTION

The present invention relates to the art of color proofing, and in particular, to an improved lamination assembly and roller for preparing prepress color proofs, such as by the use of pressure and heat to laminate media together.

BACKGROUND OF THE INVENTION

Prepress color proofing is a procedure that is used by the printing industry for creating representative images of printed material to check for color balance and other important image quality control parameters, without the high cost and time that is required to actually produce printing plates and set up a printing press to produce an example of an intended image. These intended images may require several corrections and may be reproduced several times to satisfy or meet the requirements of the customers, resulting in a large loss of profits and ultimately higher costs to the customer.

Generally speaking, color proofs sometimes called "off press" proofs or prepress proofs, are one of three types: namely (1) a color overlay that employs an image on a separate base for each color; (2) a single integral sheet process in which the separate color images are transferred by lamination onto a single base; and (3) a digital method in which the images are produced directly onto or transferred by lamination onto a single base from digital data.

In one typical process for a prepress color proofing system used in the printing industry, a multicolor original is separated into individual transparencies, called color separations, the three subtractive primaries and black. Typically a color scanner is used to create the color separations and in some instances more than four color separations are used. The color separations are then used to create a color proof sometimes called an "off press" proof or prepress proof as described above.

A Kodak Color Proofing Laminator can be used to bond lamination sheets to receiver stock as a part of a color proofing system. The lamination sheets include a carrier and a layer of material to be applied to the receiver stock, which, in the case of the Kodak Color Proofing Laminator, is a color donor. A lamination sheet is laid upon the receiver stock with the color donor side sandwiched between the carrier and the receiver stock forming a lamination sandwich.

FIG. 1 shows a laminator 12 as described in U.S. Pat. No. 5,478,434. As shown in FIG. 1, a lamination sandwich 10 sits on an entrance table 20. A leading edge of lamination sandwich 10 is fed into a laminator 12 which includes an upper heated pressure roller and a lower heated pressure roller. Lamination sandwich 10 passes completely through the upper heated pressure roller and the lower heated pressure roller. Lamination sandwich 10 thereafter exits the upper heated pressure roller and the lower heated pressure roller and comes to rest on an exit table 14 undisturbed until the trailing edge is cool to the touch; whereupon the topmost carrier can be peeled away from receiver stock and from the transferred color donor. With the configuration of an upper heated pressure roller and a lower heated pressure roller as described above, the laminator is called a straight-through laminator. Further details of this type of lamination/de-lamination system can be found in the above patent. As an additional reference U.S. Pat. No. 5,203,942 describes a lamination/de-lamination system as applied to a drum laiminator.

While the above-described laminator works well for a some materials and in limited conditions, there are many conditions and materials that cannot be laminated successfully using the above-described laminator. One problem is the intended image shifting from one color to another such that the dots/image from one color to the next are not overlaid correctly causing a misregistration of the intended image. Also damage to the media may occur in the form of speckle, freckle, image wave or creases commonly know as rivers or valleys. Any of the above mentioned problems can render the intended image unacceptable to the customer.

The aforementioned problems are for the most part due to the heated pressure rollers and there application. The upper heated pressure roller and the lower heated pressure roller have hollow cores that are typically made of metal. The hollow portion of the core is for accepting a heating rod or lamp while a rubber layer or shell typically of silicone rubber is formed around the outside of core. Typically one of the heated pressure rollers will have a different durometer. Typically one heated pressure rollers of this type has a 50–60 SHORE A durometer and the other a 65–80 SHORE A durometer and in some cases they are the same SHORE A durometer. When the upper heated pressure roller and the lower heated pressure roller are pressed together they form a nip or indentation which is typically 7–10 mm wide and varies considerably along the length of the heated pressure rollers at a pressure of 40–80 PSI. Within the nip formed by the upper heated pressure roller and the lower heated pressure roller, lateral shear stresses and overdrive conditions are formed. These lateral shear stresses and overdrive conditions act upon the media being laminated together to cause the intended image to shift from one color to another color. These lateral shear stresses and overdrive conditions can also cause a defect in the final lamination in the form of creases commonly known as a rivers or valley, as described above. These lateral sheer stresses and overdrive conditions can also cause image growth which can be different with each color, causing the intended image to be misregistered from one color to the next color or to be larger than the original image or printed image. Also these lateral sheer stresses and overdrive conditions can cause the bond that holds the rubber on the core to fail letting the rubber to delaminate from the core.

SUMMARY OF THE INVENTION

An object of the present invention is to provide for an apparatus and method that overcome or reduces the drawbacks noted above The present invention provides for a laminator and heated pressure roller arrangement that overcomes lateral shear stresses and overdrive conditions, and allows the use of low durometer rubber or of a compressible rubber.

The present invention further provides for a heated pressure roller that allows the use of a wider nip, and permits a wider range of media to be laminated.

The present invention further provides for a heated pressure roller that allows a wider range of conditions for lamination, and permits a wider range of media thicknesses to be laminated.

The present invention also provides for a heated pressure roller that overcomes or reduces image growth and overcomes or reduces image shift from one color to another. Additionally, the present invention provides for a heated pressure roller that overcomes or reduces defects such as creases, rivers or valleys.

According to a feature of the present invention, a laminating system for bonding, to a paper receiver stock, a thermal print media of the type including a carrier and a material to be applied to the paper receiver stock, includes an improved pair of heated pressure rollers through which a sandwich of thermal print media and paper receiving stock is fed. The pair of heated pressure rollers have been improved by adding, to at least one of the heated pressure rollers, a metal or plastic belt or tube over a rubber layer of the heated roller. This serves to prevent lateral stresses or overdrive conditions from acting on the thermal print media or paper receiving stock.

The present invention relates to a laminator assembly which comprises a first roller located on a first side of a media passage; and a second roller located on a second side of the media passage so as to oppose the first roller. A nip portion is defined between the first and second rollers so as to apply pressure to media in the media passage which passes through the nip portion. Each of the first and second rollers is a heated roller that comprises a heating core and a substantially solid layer which surrounds the heating core. At least one of the first and second rollers comprises a first deformable layer which surrounds the substantially solid layer and a second deformable layer which surrounds the first deformable layer and forms an outer surface of the "at least one" first and second rollers.

The present invention also relates to a laminating roller assembly for a laminator which comprises first and second opposing rollers; wherein one of the first and second opposing rollers comprises a heater core, a substantially solid or compressible layer which surrounds the heater core, a first deformable layer which surrounds the substantially solid or compressible layer and a second deformable layer which surrounds the first deformable layer and forms an outer surface of the one of the first and second opposing rollers.

The present invention also relates to a laminator assembly that comprises a first roller located on a first side of a media passage; and a second roller located on a second side of the media passage so as to oppose the first roller. A nip portion is defined between the first and second rollers so as to apply pressure to media in the media passage which passes through the nip portion; wherein at least one of the first and second rollers comprises a first deformable layer and a second deformable layer which surrounds the first deformable layer and forms an outer surface of the at least one of the first and second rollers to contain the rubber to prevent lateral sheer stresses and over drive conditions.

The present invention also relates to a laminator assembly that comprises a first roller located on a first side of a media passage; and a second roller located on a second side of the media passage so as to oppose the first roller. A nip portion is defined between the first and second rollers so as to apply pressure to media in the media passage which passes through the nip portion; wherein at least one of the first and second rollers comprises a first deformable layer and a second deformable layer which surrounds the first deformable layer and forms an outer surface of the at least one of the first and second rollers to contain the rubber to prevent the first deformable layer from destroying the bond and coming off the roller core.

The present invention further relates to a laminating method which comprises the steps of forming at least one deformable layer on at least one of first and second pressure rollers so as to increase a width of a nip portion between the first and second pressure rollers; and passing a media to be laminated between the first and second pressure rollers and through the nip portion having the increased width.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed, in particular, to elements forming part of, or cooperating more directly with, an apparatus in accordance with the present invention. It is to be understood that elements not specifically shown or described may take various forms well known to those skilled in the art. For the sake of discussion, but not limitation, the preferred embodiment of the present invention will be illustrated in relation to a laminating apparatus for making image proofs on a paper receiver stock, since the usual proofing practice is to make a hard copy of the image proof on paper. The present invention, however, is not limited to making hard copies of proof images on paper, since it can produce hard copies of images on a wide variety and thicknesses of media that may be used in the printing process.

Figure 2:
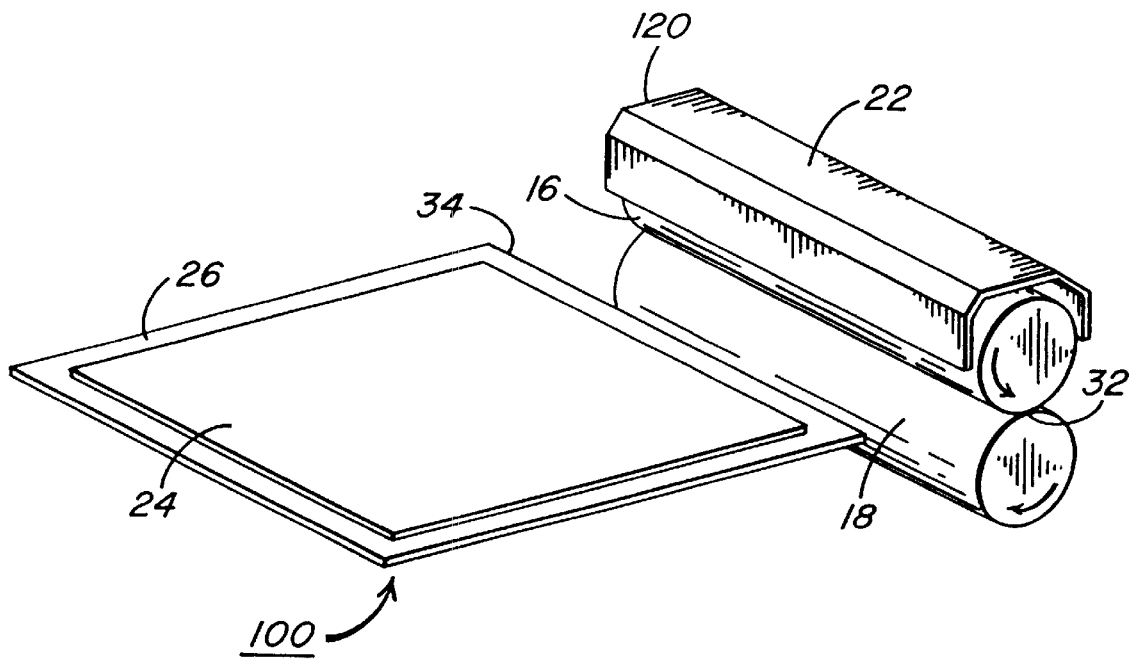
FIG. 2 is a perspective view showing the loading operation of a laminator according to a preferred embodiment of the present invention.

Referring now to the drawings, wherein like reference numerals represent identical or corresponding parts throughout the several views, FIG. 2 shows a pair of rollers, in the form of an upper heated pressure roller 16 and a lower heated pressure roller 18 of a laminator 120 according to the present invention. Upper heated pressure roller 16 is provided with a roller cover 22 to protect the operator. The remainder of the laminator 120 has been omitted from the illustration for clarity, As shown in FIG. 2, media in the form of an assembled lamination sandwich 100 is made up of thermal print media 24 and paper receiving stock 26. Thermal print media 24 can include a transfer layer, on an image bearing side of thermal print media 24 facing paper receiving stock 26, which is to be applied to paper receiving stock 26 when heat and pressure are applied to lamination sandwich 100.

Figure 1:
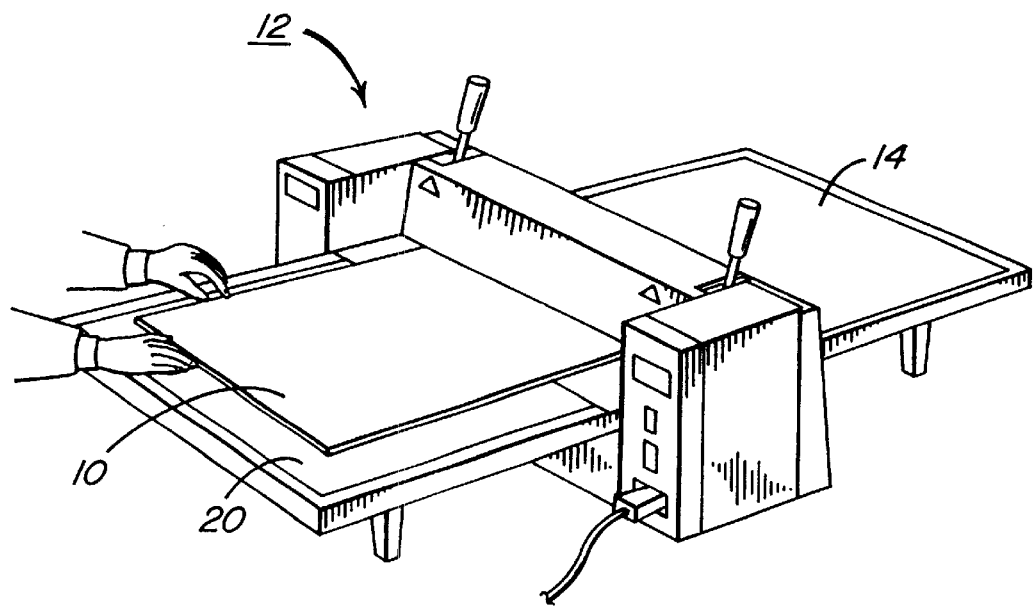
FIG. 1 is a perspective view showing a laminator known in the related art.
Figure 3:
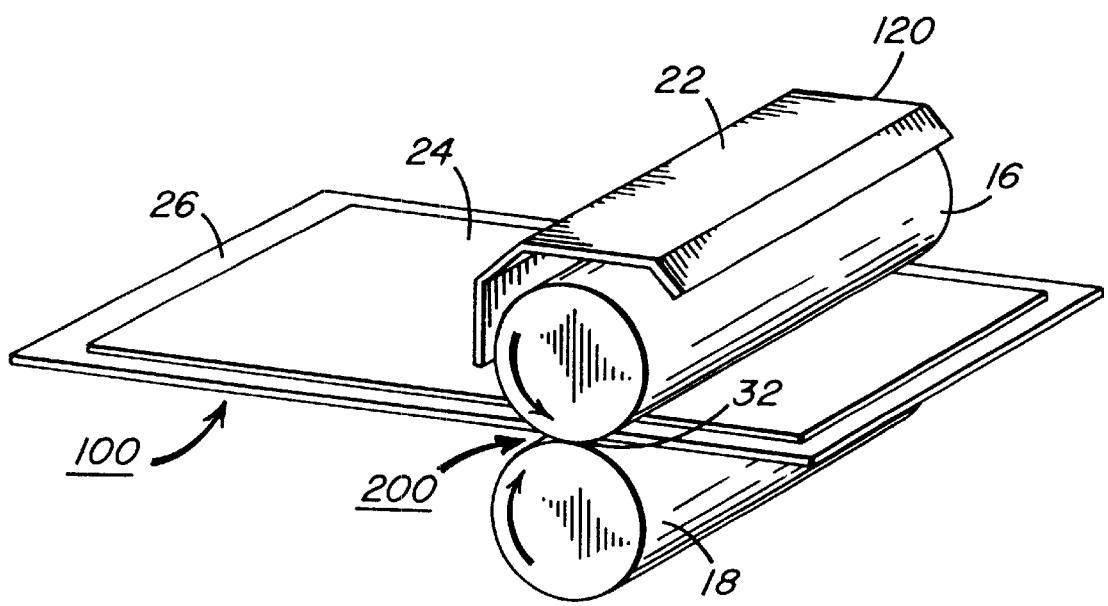
FIGS. 3–5 are schematic side elevation views showing progressive stages of operation of the laminator of FIG. 2.
Figure 4:
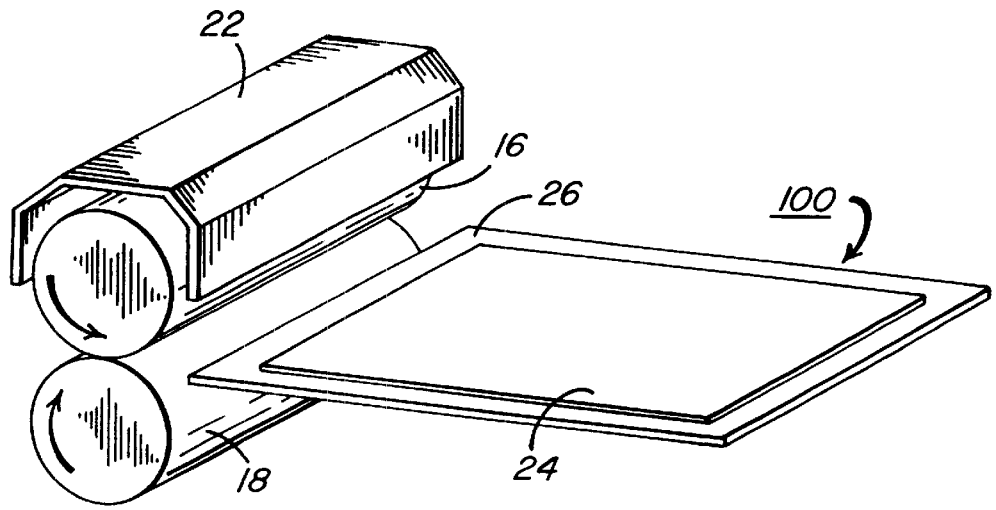
Figure 5:
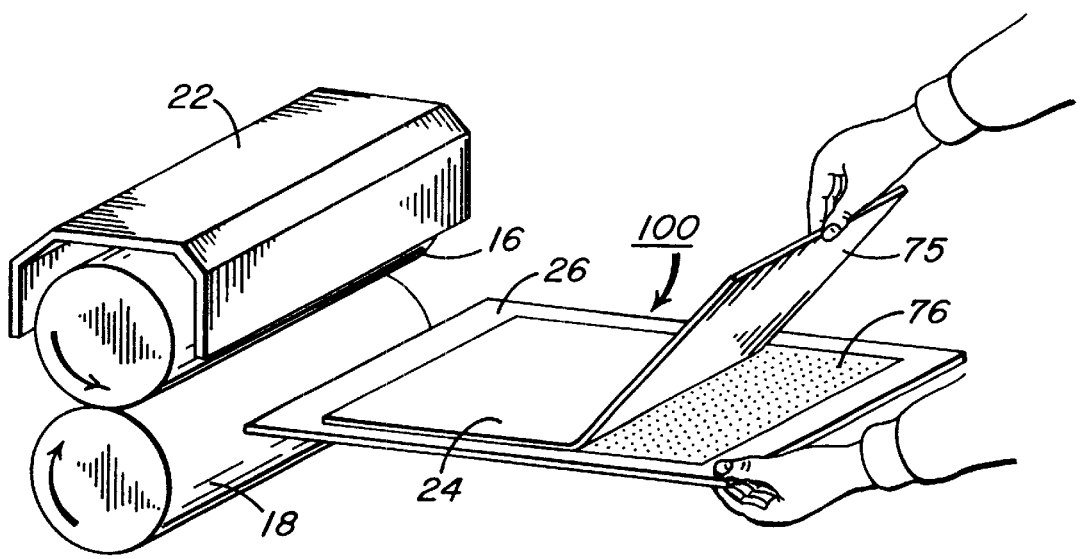

Referring now to FIGS. 3–5, lamination sandwich 100 made up of thermal print media 24 positioned on paper receiving stock 26 travels along a media passage 200 to a nip portion 32 between heated pressure rollers 16 and 18. Upper heated pressure roller 16 and lower heated pressure roller 18 can each contain a heating element 30 (see FIGS. 6–8) that respectively apply heat to the surfaces of upper heated pressure roller 16 and lower heated pressure roller 18. Pressure is applied to upper heated pressure roller 16 and lower heated pressure roller 18 in a known manner by, for example, eccentrics, levers, etc. that are not shown. Lower heated pressure roller 18 can be driven such that when upper heated pressure roller 16 and lower heated pressure roller 18 are pressed together they both rotate. A lead edge 34 (FIG. 2) of lamination sandwich 100 is fed into nip portion 32 formed by moving upper heated pressure roller 16 and lower heated pressure roller 18. Lamination sandwich 100 is heated and thermal print media 24 positioned on paper receiving stock 26 are pressed together (FIG. 3) as they pass through nip portion 32 formed by upper heated pressure roller 16 and lower heated pressure roller 18. As lamination sandwich 100 emerges from nip portion 32 formed by upper heated pressure roller 16 and lower heated pressure roller 18 being pressed together (FIG. 4), until it exits nip portion 32 and on to the exit table 14 as shown in FIG. 1. After lamination sandwich 100 cools sufficiently a support layer of thermal print media 75 is peeled from the laminated sandwich leaving behind a prepress proof 76 as shown in FIG. 5 and described in U.S. Pat. No. 5,203,942.

Figure 6:
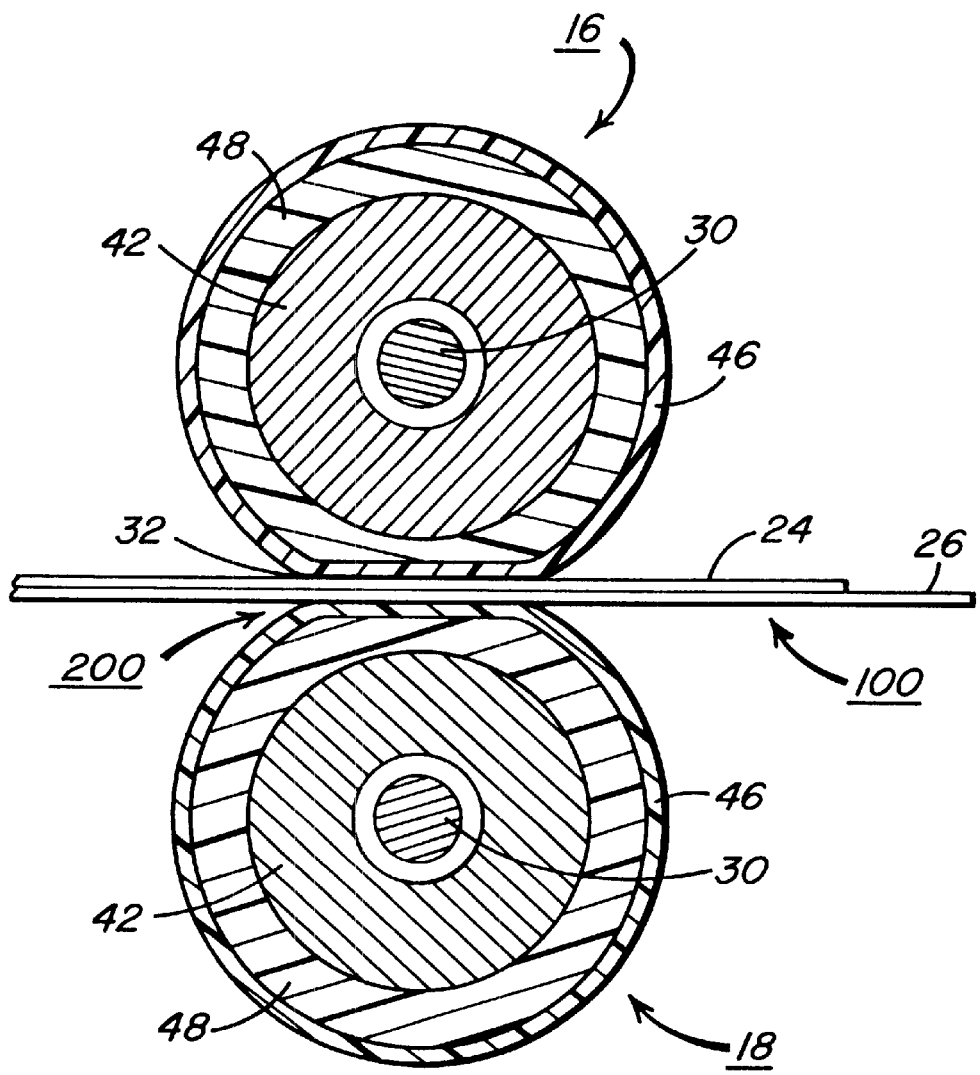
FIGS. 6–8 are schematic side elevation views showing alternative details of the heated pressure rollers according to the present invention of FIG. 2.
Figure 7A:
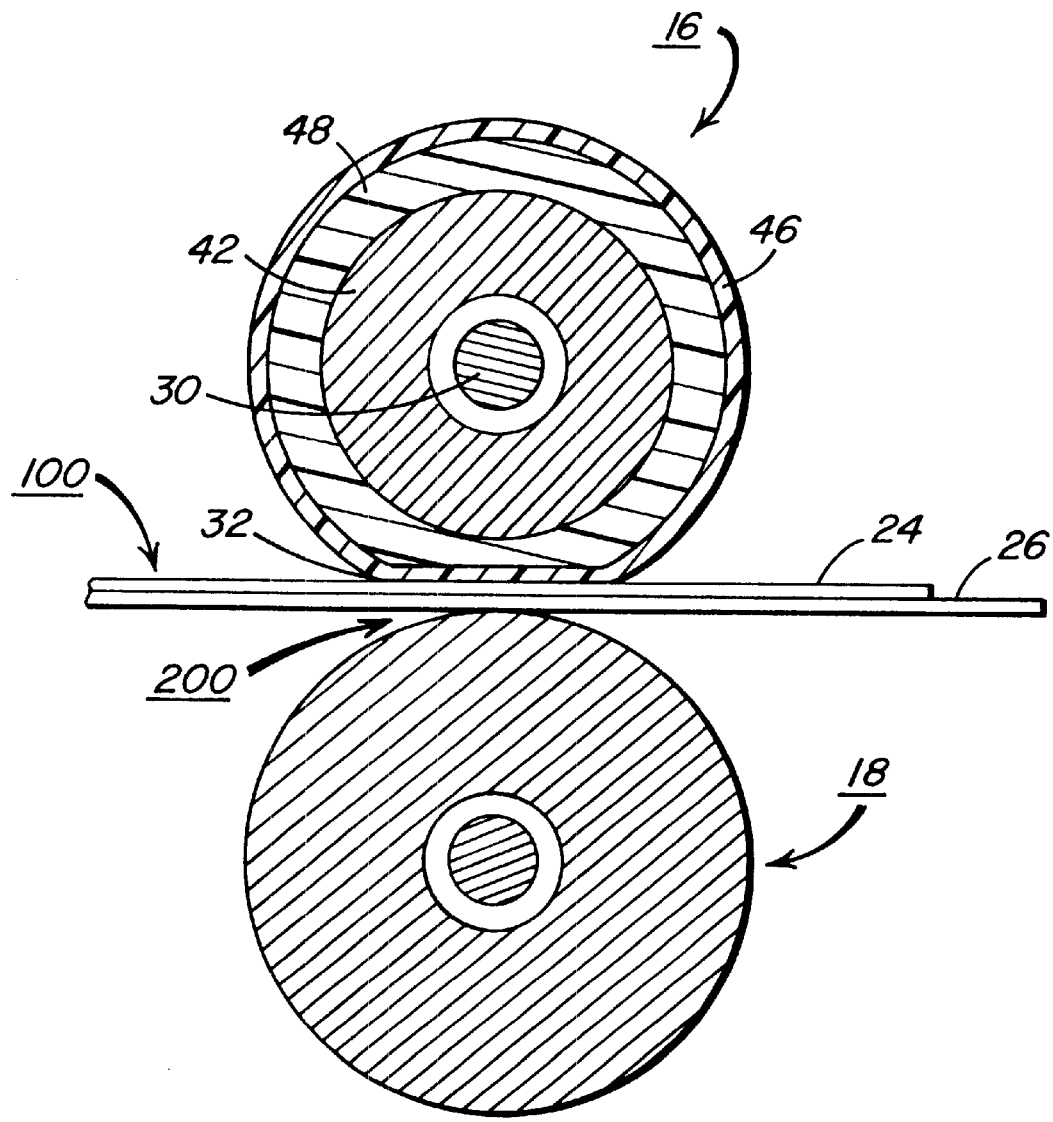
Figure 7B:
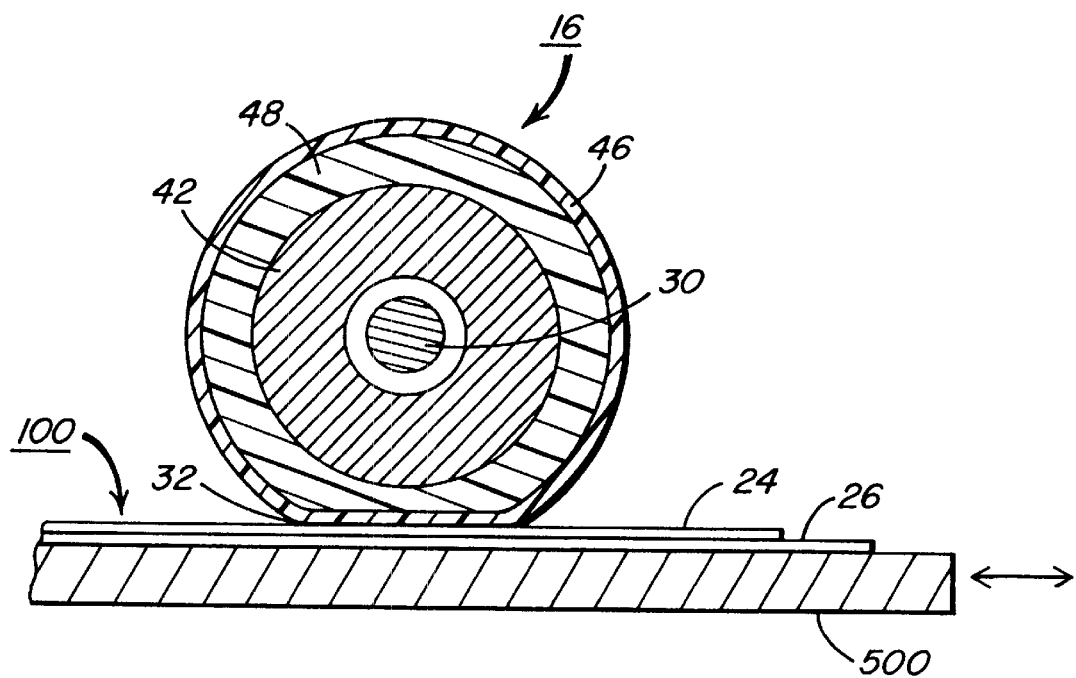
Figure 8:
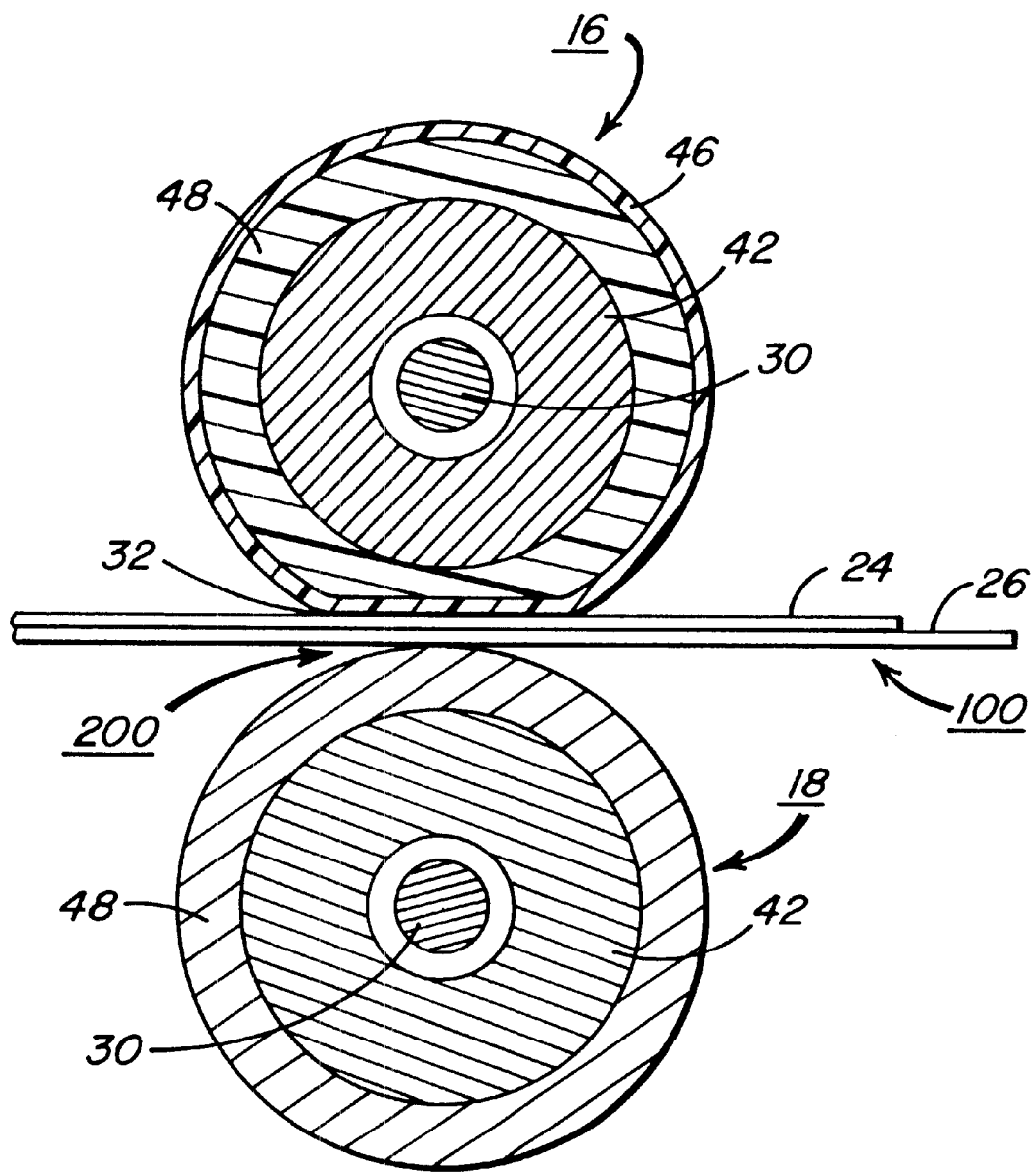

FIGS. 6–8 are schematic side elevation views showing details as well as alternate details of heated pressure rollers 16, 18 according to the present invention of FIG. 2. In FIG. 6 upper heated pressure roller 16 and lower heated pressure roller 18 are shown. Both upper heated pressure roller 16 and lower heated pressure roller 18 are of the same construction. That is, both upper heated pressure roller 16 and lower heated pressure roller 18 include a metal or substantially solid hollow core or layer 42 which is adapted to accept heating element 30. A deformable sleeve or layer 48 is formed around layer 42 in a known manner so as to surround and be bonded to layer 42. Deformable layer 48 can be a low durometer rubber, a compressible rubber, a solid rubber silicone, a foam silicone rubber or other materials such as urethane which exhibit deformable or compressible properties. A roller sleeve or layer 46 which makes up a second deformable layer is shown around layer 48. Layer 46 can be in the form of a metal or plastic belt or tube.

Typically in the industry a fluorine resin is coated onto the silicone or a fluorine tube is made and shrunk fit onto the silicone layer using a bonding agent. This has been the practiced since early 1992 While this works somewhat for light pressure and low temperature applications. In the case of lamination this is impractical, tubes made of a fluorine material have a low and limited temperature range. They typically continue to shrink with higher temperatures this causes the tube to split or delaminate from and walk off the silicone layer destroying the roller. While coated fluorine rollers cannot achieve sufficient integrity for high temperature or high pressure applications. For this application the preferred embodiment is the use of a polyimade and better yet a polimade with silicone. While metal can be used it is subject to damage dents which can render it non-useable. Although the outer deformable layer 46 can be made as a tube fashioned by a dip-coated skived or extruded methods, because the tube must be placed in a mold to cast the first deformable layer 42 the tolerances required make it impractical. The preferred method is form the outer deformable layer 46 by a spin-cast method in the same tool used to cast the first deformable layer 42 without removing the outer deformable layer 46. After the outer deformable layer 46 is spin-cast the tool with the outer deformable layer 46 is removed. A substantially solid hollow core or layer 42 is added. Then the first deformable layer 42 is cast or foamed between the substantially solid hollow core or layer 42 and the outer deformable layer 46. The thickness of the outer layer 46 is greater than 50 mm.

As shown in FIG. 6, as lamination sandwich 100 passes nip portion 32, deformable layers 48 and 46 deform to increase a width of nip portion 32 and form an enlarged nip portion 32. The arrangement of the present invention permits the width of nip portion 32 to be decreased or increased as needed. Nip portion 32 is also substantially uniform as it extends along a rotational axis of heated pressure rollers 16, 18. This configuration overcomes or minimizes lateral shear stresses and overdrive as lamination sandwich 100 passes nip portion 32. In the embodiment of FIG. 6, since both rollers are of the same construction, the increased width nip portion 32 is formed on both sides of media passage 200.

In the embodiment of FIG. 7a, the upper roller 16 has the same construction as the heated pressure roller 16 shown in FIG. 6. In FIG. 7a heated pressure roller 18 is made of a solid or substantially solid material such that only heated pressure roller 16 deforms to form nip portion 32.

FIG. 7b shows a further embodiment in which heated pressure roller 16 has the same construction as heated pressure roller 16 of FIG. 7a. In FIG. 7b a movable platen 500 having media 100 retained thereon is axially moved passed heated pressure roller 16 to cause rotation of heated pressure roller 16. In the embodiment of FIG. 7b, heated pressure roller 16 deforms as shown in FIG. 7a.

In the embodiment of FIG. 8, heated pressure roller 16 has the same construction as heated pressure roller 16 of FIGS. 6 and 7a, 7b. Heated pressure roller 18 of FIG. 8 includes heater core 30 and metal or substantially solid core or layer 42 which surrounds heater core 30. In the embodiment of FIG. 8, the outer circumference of heated pressure roller 18 is formed by layer 48. Therefore, as shown in FIG. 8, heated pressure roller 16 deforms to form nip portion 32.

Although the illustrated embodiments show both pressure rollers as heated pressure rollers, it is recognized that only one pressure roller can be heated. It is further recognized that both pressure rollers do not have to be heated for cold lamination applications.

The invention has been described in detail with particular reference to certain preferred embodiments thereof, but it will be understood that variations and modifications can be effected within the scope of the invention.

What is claimed is:

1. A laminating roller assembly comprising:
 a first roller located on a first side of a media passage;
 a second roller located on a second side of said media passage so as to oppose said first roller, wherein a nip portion is defined between said first and second rollers so as to apply pressure to media in said media passage which passes through said nip portion;
 wherein each of said first and second rollers is a heated roller comprising a heating core and a substantially solid layer which surrounds said heating core, and at least one of said first and second rollers comprises a first deformable layer which surrounds said substantially solid layer and a second deformable layer which surrounds said first deformable layer and forms an outer surface of said at least one of said first and second rollers; and
 wherein said second deformable layer comprises a polyimade.

2. A laminating roller assembly comprising:

a first roller located on a first side of a media passage;

a second roller located on a second side of said media passage so as to oppose said first roller, wherein a nip portion is defined between said first and second rollers so as to apply pressure to media in said media passage which passes through said nip portion;

wherein each of said first and second rollers is a heated roller comprising a heating core and a substantially solid layer which surrounds said heating core, and at least one of said first and second rollers comprises a first deformable layer which surrounds said substantially solid layer and a second deformable layer which surrounds said first deformable layer and forms an outer surface of said at least one of said first and second rollers; and wherein said second deformable layer comprises polyimade with silicone.

3. A laminating roller assembly for a laminator, said laminating roller assembly comprising:

first and second opposing rollers, wherein one of said first and second opposing rollers comprises a heater core, a substantially solid layer which surrounds said heater core, a first deformable layer which surrounds said substantially solid layer and a second deformable layer which surrounds said first deformable layer and forms an outer surface of said one of said first and second opposing rollers;

wherein said first deformable layer is a silicone layer and said second deformable layer is a plastic tube which surrounds said silicone layer;

wherein the other of said first and second opposing rollers further comprises a second deformable layer which surrounds said first deformable layer; and wherein said second deformable layer comprises a polyimade.

4. A laminating roller assembly for a laminator, said laminating roller assembly comprising:

first and second opposing rollers, wherein one of said first and second opposing rollers comprises a heater core, a substantially solid layer which surrounds said heater core, a first deformable layer which surrounds said substantially solid layer and a second deformable layer which surrounds said first deformable layer and forms an outer surface of said one of said first and second opposing rollers;

wherein said first deformable layer is a silicone layer and said second deformable layer is a plastic tube which surrounds said silicone layer;

wherein the other of said first and second opposing rollers further comprises a second deformable layer which surrounds said first deformable layer; and wherein said second deformable layer comprises polyimade with silicone.

5. A laminating roller assembly according to claim 3, wherein said second deformable layer has a thickness is greater than 50 mm.

* * * * *